United States Patent [19]
Lide, III et al.

[11] 3,783,356
[45] Jan. 1, 1974

[54] NULL BALANCE INDICATING AND CONTROL APPARATUS AND PHASE SENSITIVE PULSE RESPONSIVE CIRCUITS FOR USE THEREIN

[75] Inventors: Basil M. Lide, III, Pittsburgh; Harry Kowalcheck, West Newton, both of Pa.

[73] Assignee: Westinghouse Electric Corporation, Pittsburgh, Pa.

[22] Filed: May 6, 1965

[21] Appl. No.: 453,692

[52] U.S. Cl. .................... 318/18, 318/28, 323/75
[51] Int. Cl. .................................. G05b 11/14
[58] Field of Search ............... 323/123, 75 B, 75 E, 323/20.370, 20.360; 318/20.810, 20.715, 20.750, 20.745

[56] References Cited
UNITED STATES PATENTS

| | | | |
|---|---|---|---|
| 3,171,075 | 2/1965 | Kirk | 318/341 |
| 3,105,180 | 9/1963 | Burnett | 318/341 X |
| 3,004,199 | 10/1961 | Sakson | 318/28 |
| 2,659,850 | 11/1953 | Phillips et al. | 318/341 X |
| 2,246,575 | 6/1941 | Coleman | 323/75 B UX |
| 2,911,588 | 11/1959 | Wetherhold | 323/75 B X |
| 2,921,262 | 1/1960 | Jaffe | 323/75 B X |
| 3,076,129 | 1/1963 | Bockemuehl | 323/75 E UX |
| 3,165,681 | 1/1965 | Pinckaers | 318/28 |
| 3,250,960 | 5/1966 | Walbridge | 323/75 E X |
| 3,378,024 | 4/1968 | Kruik | 318/28 X |

Primary Examiner—Benjamin Dobeck
Attorney—A. T. Stratton, C. L. McHale and M. I. Hull

[57] ABSTRACT

In apparatus and circuits especially suitable in instrumentation for indication and control of nuclear power plant coolant systems, a bridge contains in a sensing arm a resistance thermometer or a differential transformer. The output of the bridge is supplied to a servo amplifier which feeds a servo motor which is operatively connected to a bridge arm to utilize an error signal to rebalance the bridge and reduce the error signal to zero, and at the same time supply an input to a counting or indicating device. Unique circuits provide control set points, isolation being provided between the indication and control functions. New and improved phase sensitive monostable multivibrator transistor circuits are employed.

20 Claims, 16 Drawing Figures

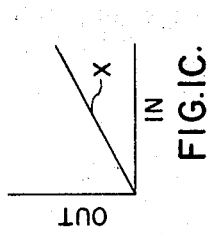
FIG.1C.
FIG.1D.
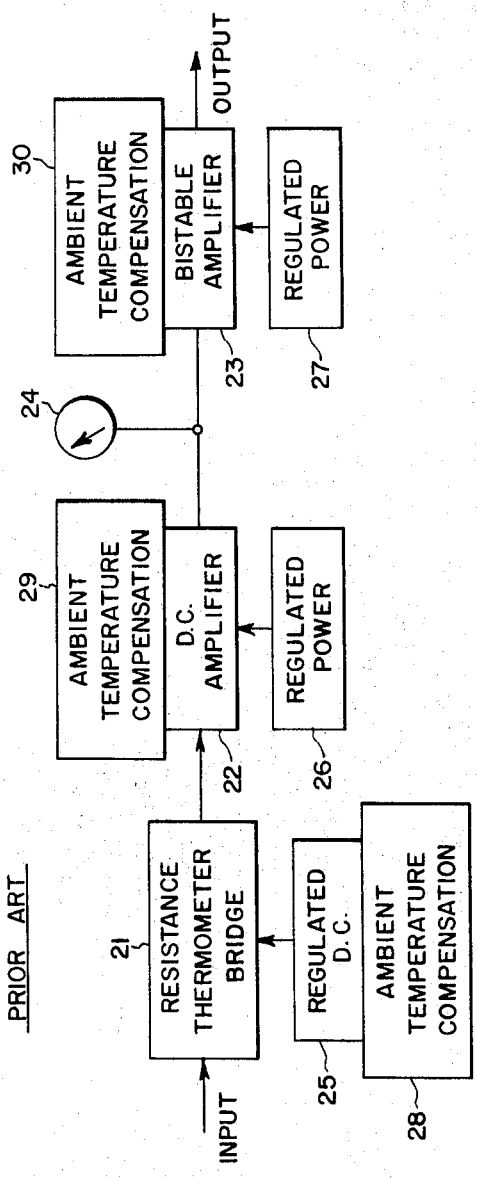
FIG.1A. PRIOR ART
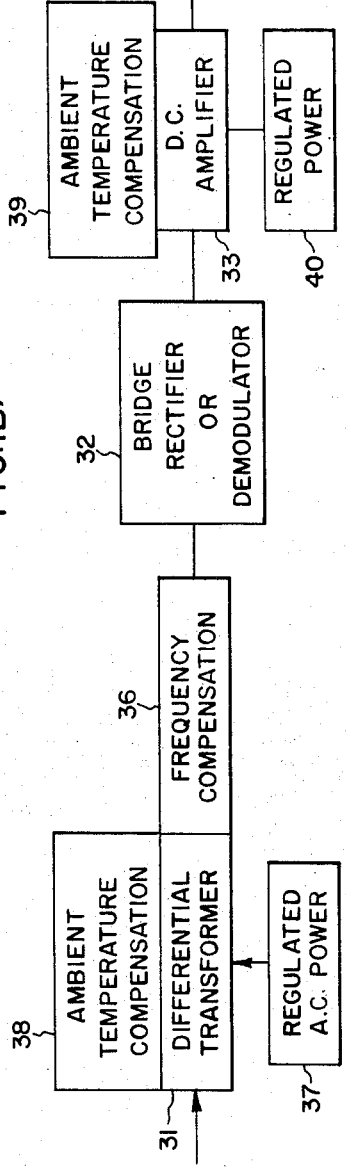
PRIOR ART
FIG.1B.

INVENTORS
Basil M. Lide
& Harry Kowalcheck
BY *Maury I. Hull*
ATTORNEY

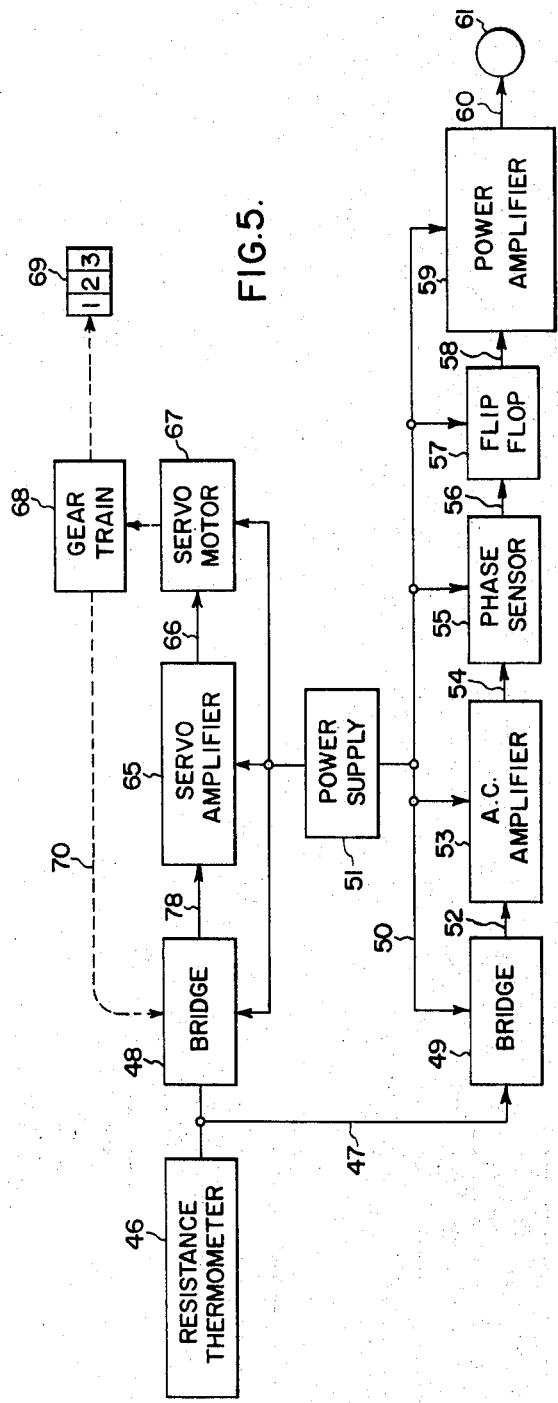
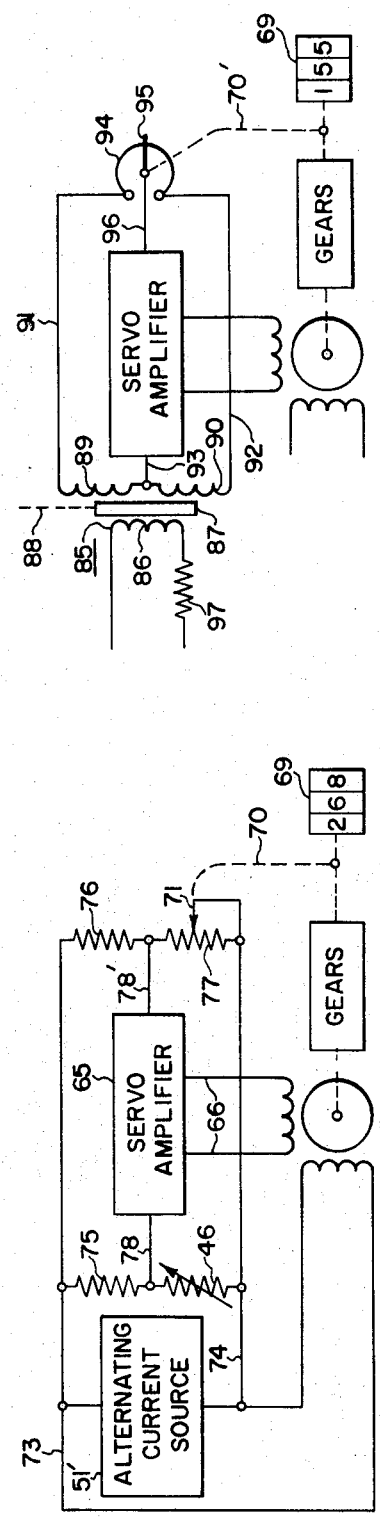
FIG.5.
FIG.6.
FIG.7.

NULL BALANCE INDICATING AND CONTROL APPARATUS AND PHASE SENSITIVE PULSE RESPONSIVE CIRCUITS FOR USE THEREIN

This invention relates to improvements in indicating and control apparatus, and more particularly to an improved circuit employing a single transducer providing both indication and control functions, the circuit supplying a null balance servo type of indication, the circuit including a phase sensitive pulse responsive control amplifier feature to supply a control function which is substantially independent of the indication function.

The apparatus and circuit of the instant invention are especially suitable in instrumentation for indication and control of nuclear power plant coolant systems, although the use of the apparatus and circuits is not limited thereto. Prior art indication and control circuits and apparatus employed with nuclear power plant coolant systems, generally speaking, make use of linear open-loop circuits to provide an indication of a plant parameter. Output signals from "linear" devices are also used to operate bistable amplifiers for control functions, such as safety shut-down. These prior art devices, circuits and systems are characterized by a number of disadvantages: all gains must be stabilized to a high degree; supply voltages must be well regulated; compensation must be provided for supply voltage frequency changes; compensation must be provided for ambient temperatue changes; and others.

Accuracy requirements under the wide variation of equipment ambient conditions have made refinement of the "open loop" systems impractical. These ambient conditions may be as follows: line voltages, 115 ± 10 percent nominal; frequency, 60 cycles ± 5 percent; voltage transients, ± 30 percent from nominal; and ambient temperature ranges, 25° to 65°C. When it is recalled that the desired overall accuracy of the output signals is, for example, one-half of 1 percent on reactor coolant temperature measurements, and 2 percent on reactor loop pressure measurements under the worst combination of the above conditions, it is apparent that these accuracy requirements under the wide variation in conditions could be met only by the most expensive and refined equipment.

The apparatus of the instant invention overcomes these and other disadvantages of the prior art. In summary, our apparatus in one typical application includes but is not limited to a transducer, which may be a resistance thermometer or a differential transformer, connected in a bridge circuit which contains a rheostat or potentiometer having an adjustable resistance value, such as may be obtained by use of an arm with an adjustable setting; the bridge may be maintained in balance by adjusting the position of the arm. The bridge is excited by an alternating current of selected frequency, usually the supply line frequency for convenience. While D.C. voltages could be used for the bridge supply, the advantage of drift-free amplification would not be easily attained as with A.C. amplifiers, as will be seen later. In the indication portion of our apparatus, an output of the bridge circuit is supplied to a servo amplifier, which feeds a servo motor, which is operatively connected to a bridge arm to utilize an error signal to rebalance the bridge and reduce the error signal to zero, and at the same time supply an input to a counting or indicating device. In usual applications of null balance indicators such as servo operated slide wire recorders, for example, when the need arises for on-off control points these are derived by mechanical means such as switches and cams operated from the slide wire drive shaft or from circuits operating from auxiliary tandem slide wires. Such systems have the following disadvantages.

1. The control function reliability depends on mechanical means, such as moving slide wires and gears, and is relegated to a position of secondary importance in respect to the indicating function. Such things as chart paper, pens, etc. contribute to unreliability of such devices if used for control. 2. Response time of control functions depend on the slow moving servo systems.

In summary, the circuits of our invention which provide for control set points employ the sensing element portion of the bridge with a separate manually adjustable balance arm for signal to the control point circuits. By proper choice of input impedances nearly complete isolation is provided between the indication and control functions. To obtain accurate trip point of the control circuits the control arm of the bridge is operated close to bridge balance by use of high gain amplification of control bridge error and utilizing phase change of the output of the amplifier to detect a change through balance of the bridge sensing element. Thus, the higher the amplifier gain the more accurate the trip point since the bridge output approaches zero at trip as the amplifier approaches infinite gain. Dependence on gain stability of the amplifier and the bridge supply is eliminated since the trip signal occurs at bridge null with almost zero into the amplifier.

The output signal which appears when the bridge goes through null, as detected by the phase sensing amplifier, is supplied to a monostable multivibrator circuit and causes the monostable circuit to change from a first condition or state to a second condition or state.

Accordingly, a primary object of our invention is to provide new and improved null-balance servo control apparatus.

Another object is to provide a new and improved phase sensitive pulse responsive circuit for use in control applications.

An additional object is to provide a new and improved null balance servo indication and control system especially suitable for instrumentation and control of nuclear power coolant systems.

A further object is to provide a new and improved phase sensitive monostable multivibrator transistor circuit.

Still another object is to provide apparatus for controlling the coolant system of a nuclear power plant in which control and indication functions, while necessitating only a single transducer, are nevertheless substantially independent of each other.

Still a further object is to provide new and improved control and indicating apparatus the accuracy of which will not be substantially influenced by wide variations in ambient conditions and variations in power input.

These and other objects will become more clearly apparent after a study of the following specification, when read in connection with the accompanying drawings, in which:

FIGS. 1A and 1B show linear open loop systems according to the prior art, the system of FIG. 1A employing a resistance thermometer bridge, and the system of FIG. 1B employing a differential transformer;

FIG. 5 is a block diagram of the apparatus and circuit of our invention showing both the indication and control portions of the apparatus;

FIG. 6 is a fragmentary view of a portion of the circuit of our invention according to one embodiment thereof;

FIG. 7 is a fragmentary view similar to FIG. 6 in which a differential transformer is utilized as the transducing element;

Figure 2:
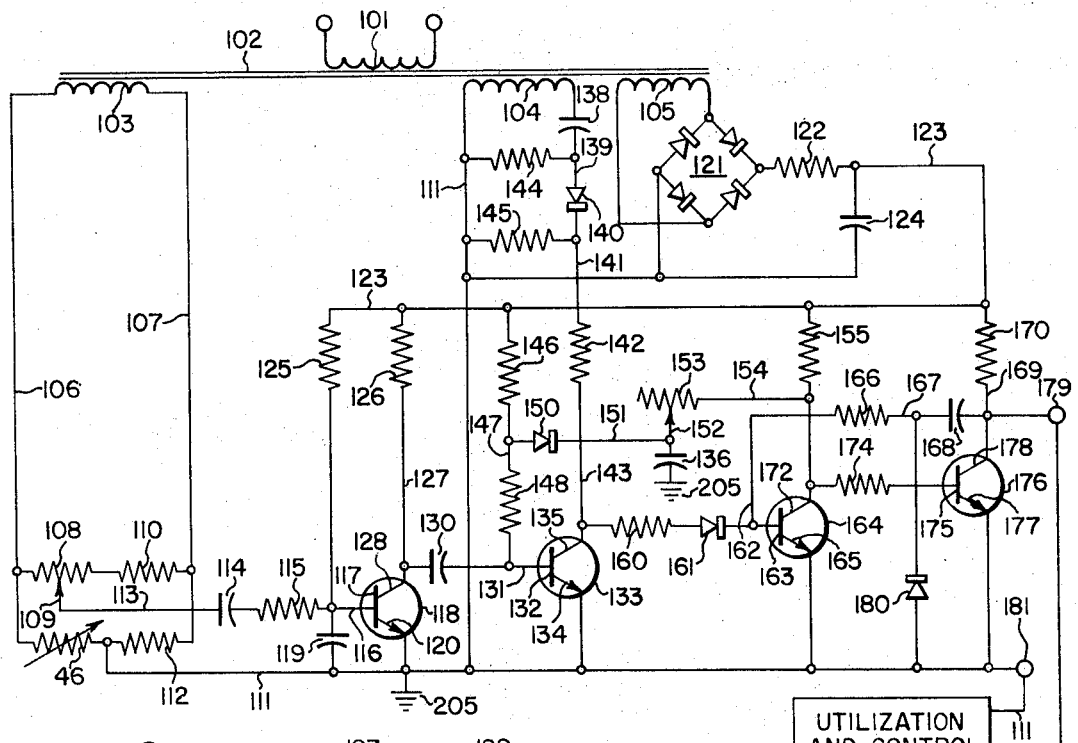
FIG. 2 is a schematic electrical circuit diagram of a resistance thermometer bridge and a phase sensitive monostable multivibrator transistor circuit as connected in the control portion of our invention.

Referring now to the drawings, in which like reference numerals are used throughout to designate like parts, for a more detailed understanding of the invention, and in particular to FIG. 1A thereof which shows a prior art arrangement, a resistance thermometer bridge 21, which acts as a transducer for providing an electrical signal which varies in accordance with variations in some quantity, is shown supplying its output to a direct current amplifier 22, which feeds a bistable or astable amplifier 23, which controls a controlled device, not shown for convenience of illustration, the direct current amplifier also providing an indication at 24 of the value of the input quantity. It is noted that regulated power supplies 25, 26 and 27 are required for the circuit devices including the bridge 21, the direct current amplifier 22 and the bistable or astable amplifier 23 respectively, and that means for ambient temperature compensation is provided for each of these, these ambient temperature compensating means being shown in block form at 28, 29 and 30 respectively. Those skilled in the art will readily understand the additional complexity and expense necessitated by providing regulated power, and temperature compensation. The nature of this arrangement is shown in FIGS. 1C and 1D. In FIG. 1C, the output of the D.C. amplifier 22 is plotted as a function of input, with the desired trip point indicated by the point X. The trip point of the bistable or astable amplifier 23 is indicated in FIG. 1D, where output of the bistable or astable amplifier is shown as a function of input, the trip point being indicated at point Z.

In FIG. 1B a prior art arrangement is shown employing a differential transformer as the transducer, the differential transformer 31 supplying its output by way of frequency compensating means 36 to a bridge rectifier 32, which supplies an output to direct current amplifier 33, which supplies an output to indicator 34 and bistable amplifier 35. It is noted that the differential transformer 31 must be supplied with regulated alternating current power from source 37, and must have ambient temperature compensation by means 38. In addition, the D.C. amplifier 33 must have ambient temperature compensation by means 39 and regulated power from source 40, and the bistable amplifier 35 must have ambient temperature compensation by suitable means 41 and regulated power from source 42. Curves similar to those of FIGS. 1C and 1D would represent the outputs of the D.C. amplifier 33 and the bistable amplifier 35 respectively.

Particular reference is made now to FIG. 5, showing in block form a circuit and apparatus according to one embodiment of our invention. A resistance thermometer, which has a resistance value which varies with variations in the temperature thereof, shown in block form at 46, is connected by lead means 47 to two bridge circuits shown in block form at 48 and 49. As will be seen hereinafter, these bridges may have a common branch containing the transducer. Bridge 49 has alternating current supplied thereto by lead means 50 from power supply 51 which provides both alternating current and direct current as needed, the bridge 49 supplying its output by lead means 52 to an alternating current amplifier 53, which supplies an output by lead means 54 to a phase sensitive circuit 55 which also has alternating current of the same frequency supplied thereto from power supply 51. When the input to the phase sensor circuit 55 is of a certain polarity and phase relationship to the alternating current, and attains a certain amplitude, the output of the phase sensor as developed on lead means 56 causes the flip-flop 57 to change from its steady state to another quasi-stable state and supply or cut off an output to a power amplifier, the output of the flip-flop 57 being supplied to the power amplifier 59 by lead means 58. Power amplifier 59 may be a silicon controlled rectifier, and associated circuitry. The output of the power amplifier 59 is supplied by lead means 60 to the control device 61 which may be, for example, a valve controlling the temperature of the chamber or device where resistance thermometer 46 is located. Power amplifier 59 may be omitted if desired.

The aforementioned resistance thermometer 46 is also connected to an additional bridge circuit 48, which may be similar to the bridge circuit of FIG. 6. The output of the bridge 48 is supplied by lead means 78 to a servo amplifier 65 which supplies an output by lead means 66 to a servo motor shown in block form at 67. The servo motor is mechanically connected to a gear train device 68, which is operatively connected to a counting or indicating device 69, and which is also connected by mechanical coupling 70 to the arm 71 of a potentiometer in the bridge circuit, FIG. 6, to which particular reference is made. It is seen that alternating current from source 51' is supplied by leads 73 and 74 across a bridge consisting of resistor 75 and resistance thermometer 46 in one branch thereof, and resistor 76 and variable resistor 77 in the other branch thereof. The junction between resistor 75 and thermometer 46 is connected by way of lead 78 to one input terminal of the servo amplifier 65, whereas the junction between resistor 76 and variable resistor 77 is connected by way of lead 78' to the other input terminal of the servo amplifier 65. The arm 71, which may have the setting thereof on resistor 77 varied by mechanical linkage 70, provides for varying the total resistance of resistor 77.

It will be seen from a study of the circuit of FIG. 6 that the null balance arrangement renders the circuit independent of certain varying parameters and varying ambient and power supply conditions aforementioned. In FIG. 6, let resistor 75 have a value R and let resistor 76 have a value $K_1R$. The resistance thermometer 46 has a value $R_t$ and a voltage $E_1$ is developed between lead 74 and lead 78. The resistor 77 has a value $K_1R_t$ and a voltage $E_2$ is developed between lead 78' and lead 74. The value of $E_1$ is a function of temperature; when $E_1 = E_2$ the input to the amplifier, that is $E_1 - E_2$, is zero, and the counter 69 reads temperature. When temperature increases, $R_t$ increases, $E_1$ increases, and the difference $E_1 - E_2$ is applied to the amplifier. The motor runs the servo potentiometer until $E_1 = E_2$ and then stops. The counter reads the new temperature. At balance it will be noted that line voltage variations affect $E_1$ and $E_2$ identically, and $E_1 - E_2$ remains zero regardless of line voltage fluctuations.

Particular reference is made now to FIG. 7, in which an embodiment of the invention according to FIG. 5 but employing a differential transformer as the transducer of the bridge, is shown. The differential transformer is generally designated 85 and has a primary 86, a movable slug 87 connected to mechanical linkage 88, a pair of secondaries 89 and 90, and a junction between secondaries 93. It will be readily understood that the slug position can be proportional to pressure, or the level from a Bourdon tube, or bellows, the slug being made of a suitable material, for example iron, and varying the coupling between the primary and the two secondaries in accordance with changes in the position of the slug. It is seen that potentiometer 94 is connected between leads 91 and 92, which are connected to the outer terminals of secondaries 89 and 90 respectively. In analyzing the circuit of FIG. 7, let $E_1$ be the voltage across secondary 90, $E_2$ be the voltage across secondary 89, and $E_3$ the voltage between lead 96 connected to potentiometer arm 95, and lead 92. At balance conditions, that is, no error and no input to the amplifier, the shaft counter reads the slug position, $E_1 = E_3$, where $E_1 + E_2$ is a constant as determined beforehand by the nature of the transformer design. If the slug moves down, for example, on pressure increases, $E_1$ increases, $E_2$ decreases and $E_1 + E_2$ equals a constant. Since $E_1$ now does not equal $E_3$, the difference appears as an input to the servo amplifier. Output from the amplifier runs the motor to raise the arm 95 of the servo potentiometer until $E_3 = E_1$, and the motor stops. The counter now reads the new pressure. At balance, changes in voltage or frequency, and variations in the value of primary resistance all affect $E_1$ and $E_3$ identically, and the input remains $E_1 - E_3 = 0$. Accordingly, the reading of the counter does not change with fluctuations in line voltage, changes in ambient temperature, or changes in the resistance of the primary.

Accordingly, it is seen that the circuit arrangement of FIG. 5, when used either with a resistance thermometer or with a differential transformer, provides for an indication which is substantially independent of variations and fluctuations in some of the factors and conditions mentioned hereinbefore, such as ambient temperature and line voltage.

Particular reference is made now to FIG. 2, in which the bridge arrangement for providing a signal which is utilized for control purposes, the phase sensor circuit, and the monostable multivibrator circuit are shown in schematic electrical circuit diagram. An alternating current transformer, which it will be understood may be included in the power supply 51 of FIG. 5, has a primary 101 energized from any suitable alternating current source, not shown, a core 102 and secondaries 103, 104 and 105. The output of secondary 103 is applied by way of leads 106 and 107 across the two branches of a bridge arrangement, one of these branches including potentiometer 108 having movable contact or arm 109, and resistor 110. As employed herein the word "branch" includes two arms of a bridge, the arms being connected in series across the source. The other branch of the bridge connected across leads 106 and 107 includes in series the resistance thermometer 46, lead 111 and resistor 112. The adjustable arm 109 of potentiometer 108 provides a means of adjusting the "trip point", arm 109 being connected by way of lead 113, capacitor 114, resistor 115 and lead 116 to the base 117 of a transistor 118. Lead 116 is connected by way of capacitor 119 to lead 111, and emitter 120 is connected to lead 111.

The aforementioned secondary 105 has the terminals thereof connected to a full wave bridge rectifier generally designated 121, the negative terminal of the bridge rectifier being connected to lead 111, the positive terminal of the bridge rectifier being connected by way of resistor 122, lead 123 and capacitor 124 to the aforementioned negative lead 111. It is accordingly seen that a positive potential is developed between lead 123 and the aforementioned lead 111 which forms a common negative return. Lead 123 is connected by way of resistor 125 to the aforementioned lead 116 and base 117. Lead 123 is also connected by way of resistor 126 and lead 127 to the collector 128 of the aforementioned transistor 118.

The transistor 118 serves as a straight alternating current amplifier for amplifying the signal applied between the base and emitter thereof. Resistor 115 and capacitor 119 provide, if desired, phase correction, and resistor 115 may be made variable if desired. The aforementioned collector 128 is connected by way of capacitor 130 and lead 131 to the base 132 of an additional transistor 133 having emitter 134 thereof connected to lead 111 and having a collector 135. The transistor 133 provides phase sensing in a manner which will be more clearly apparent hereinafter.

The aforementioned secondary 104 has one terminal thereof connected to lead 111 and the other terminal thereof connected by way of capacitor 138, lead 139, rectifier 140, lead 141, resistor 142 and lead 143 to the aforementioned collector 135. Resistor 144 is connected from lead 111 to lead 139, whereas resistor 145 is connected from lead 111 to lead 141.

The aforementioned lead 123 is connected by way of resistor 146, lead 147 and resistor 148 to the aforementioned lead 131 and base 132. Lead 147 is connected by way of rectifier 150 and lead 151 to the arm 152 of a rheostat 153 having one end thereof connected by way of lead 154 and resistor 155 to the aforementioned lead 123. Lead 151 has capacitor 136 connected therefrom to ground 205.

The aforementioned collector 135 and lead 143 are connected by way of resistor 160, rectifier 161 and lead 162 to the base 163 of a transistor 164 having an emitter 165 connected to lead 111. The aforementioned lead 162 and base 163 are connected by way of resistor 166, lead 167, capacitor 168, lead 169 and resistor 170 to the aformentioned lead 123, which as aforementioned, is at a positive potential with respect to lead 111. The aforementioned transistor 164 has a collector 172 connected to the aforementioned lead 154. Collector 172 and lead 154 are connected by way of resistor 174 to the base 175 of a transistor 176. The emitter 177 of transistor 176 is connected to the aforementioned lead 111, while the collector 178 of the transistor 176 is connected to the aforementioned lead 169, thence to output terminal 179, and thence to utilization and control device 188, terminal 181, and lead 111. Device 188 may control the temperature at 46. A rectifier 180 is connected between the aforementioned lead 167 and lead 111 for purposes to become hereinafter more clearly apparent.

In the circuit of FIG. 2, bridge output is developed between leads 113 and 111, and after some slight phase shift, if desired, at 115–119, is amplified by transistor 118. It is noted that transistor 118 is an NPN transistor; the positive potential from lead 123 by way of resistor 125 applied to the base 117 forward biases the emitter 120.

Transistor 133 is a phase sensor. A pulsating direct current potential, obtained by half wave rectification of an alternating current potential of the same frequency as that applied to the bridge, is applied to the collector 135. Base 132 is normally biased slightly beyond saturation from lead 123 by way of resistor 146, lead 147, and resistor 148. Accordingly, it will be seen that positive alternations of the signal occurring on base 132 simultaneously with the application of a D.C. pulse to the collector cause no substantial output since the transistor is already at saturation. On the other hand, negative alternations of the signal on the base occurring simultaneously with the D.C. pulses of half wave rectified A.C. on the collector produce an output, since during the negative alternations, the base is not at saturation bias.

Transistors 164 and 176 comprise a multivibrator or flip-flop circuit. Rectifier 161 limits the current path in this portion of the circuit, while rectifier 180 provides a discharge path for capacitor 168 so that the circuit may readily change in either sense between states.

The circuit of potentiometer 153 and rectifier 150 is an adjustable means for changing the bias point of sensor transistor 133. When transistor 164 becomes conductive lead 154 falls in potential below that of lead 147; in accordance with the polarity of rectifier 150, current flows, increasing the voltage drop across resistor 146 and changing the bias on base 132 of transistor 133, that is, making the base less positive; the bias on transistor 133 decreases toward saturation, so that thereafter the flip-flop will substantially remain "on" or in its quasi-stable state when the input signal decreases below the original "trip on" value. Hence an adjustable means, potentiometer 153, is provided to control the "trip off" point.

In more fully understanding the operation of the circuit of FIG. 2, it should be recalled that the purpose of this circuit is to cause the multivibrator comprising transistors 164 and 176 to switch from its stable state to its quasi-stable state when a signal of at least a predetermined amplitude and of the proper phase appears between arm 109 and lead 111. It will be understood that in one mode of operation where arm 109 is initially adjusted for zero signal output, depending upon whether the bridge is off balance in one sense or direction, or in the other direction, that is, whether the resistance value of 46 increases or decreases from its initial balance value, the phase of the signal between lead 111 and 113 reverses or changes 180°.

Figure 8A:
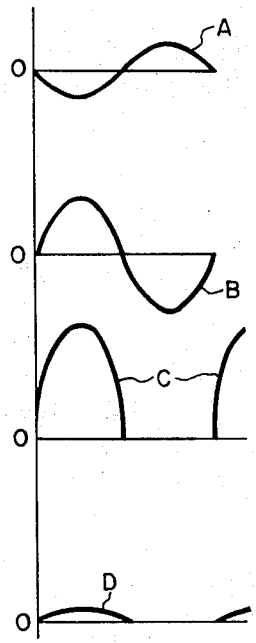
FIGS. 8A, 8B and 8C are a series of graphs illustrating the operation of the apparatus of FIG. 2 and FIG. 5.
Figure 8B:
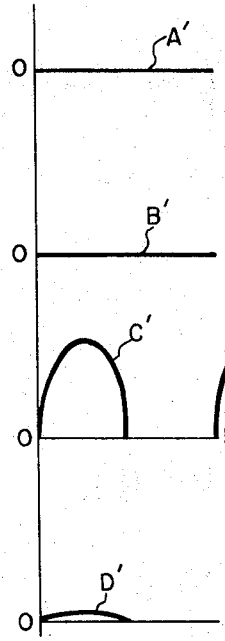
Figure 8C:
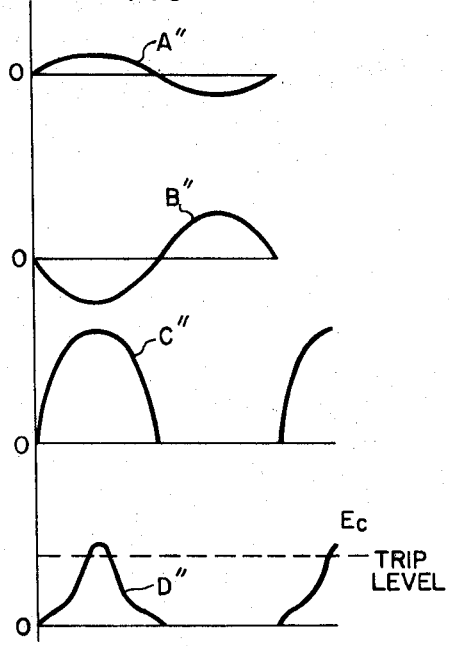

Particular reference is made now to FIG. 8A, showing signal conditions when the bridge is "below" balance in one sense or direction, where the curve A of the group of waveforms represents the bridge output, curve B indicates the amplifier output of amplifier 118, curve C the D.C. pulse output of rectifier 140, and curve D the output of phase sensor transistor 133, or $E_c$, the collector voltage, all plotted on the same time scale. FIG. 8B shows similar signals A', B', C' and D' at bridge balance, and FIG. 8C shows the signals A'', B'', C'', and D'' when the bridge is "above" balance. When the bridge is above balance and a negative alternation of the output of amplifier 118 is applied to base 132 coincident with a positive pulse applied to collector 135, an output D'' is obtained from transistor 133. If the input A'' is of sufficient amplitude, the output D'' exceeds the "trip level", as shown, causing the multivibrator to change between states.

By suitable choice of component values, polarities and lead connections, it is arranged so that phase sensitive transistor 133 has an output when the bridge is unbalanced in the desired direction, that is, the direction at which it is desired to utilize some result or indication thereof and in at least a predetermined amount. The amount of required unbalance determines the trip point, which can also be adjusted within limits by arm 109. The control function occurs when the trip point is reached. The output of transistor 133 is applied by way of resistor 160 and rectifier 161 to the base of transistor 164, the first transistor of a flip-flop circuit including also transistor 176. The operation of the flip-flop or monostable multivibrator circuit is to some extent unconventional. The base of the input transistor is coupled by way of resistor 166 and capacitor 168 to the collector 178 of the second transistor 176, whereas the collector 172 of the first transistor 164 is coupled by way of resistor 174 to the base 175 of the second transistor 176, in accordance with conventional flip-flop circuitry. Accordingly, the voltage at terminal 179 connected to collector 178 varies between two values depending upon which of the transistors 164 or 176 is conducting. While transistor 176 is conductive a very small voltage drop takes place across the transistor and accordingly terminal 179 is at substantially zero voltage with respect to terminal 181. When transistor 176 becomes non-conductive, terminal 179 rises to a relatively high voltage with respect to lead 111 and terminal 181.

Before trip-on transistor 164 is not conducting. When it becomes conductive, it remains conductive until capacitor 168 is charged through resistor 166, whereupon the circuit restores itself automatically to its original state. If the signal is still present at lead 131, the next pulse or next negative alternation on base 132 causes the flip-flop to again render transistor 164 conductive.

The apparatus or equipment to be controlled, or the element to be controlled, shown in block form as a utilization and control device 188 is operatively connected to the terminals 179 and 181. If desired, an emitter-follower transistor circuit may be connected between these terminals having, for example, a relay winding in circuit therewith. If desired, the output of the circuit as developed across terminals 179 and 181 may be applied to a controlled rectifier, for example, a silicon rectifier having a relay in the main current path thereof and a manually operated reset switch for breaking the circuit through the controlled rectifier to restore it to a non-conductive condition. Any other suitable terminating device may be employed for utilizing the signal output of the circuit of FIG. 2 to control a controlled element.

Figure 3:
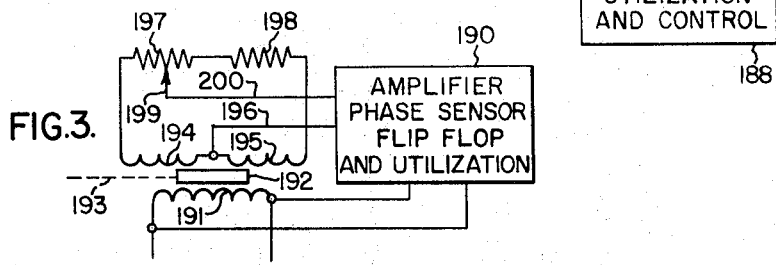
FIG. 3 is a view of the circuit of FIG. 2 partially in block form as modified to employ a differential transformer as the transducing element of the bridge.

Particular reference is made now to FIG. 3 which shows the circuit of FIG. 2 including the flip-flop amplifier connected to a differential transformer to obtain a control signal therefrom. In FIG. 3 the primary 191 has a slug 192 with mechanical linkage 193, and two secondaries 194 and 195 connected by lead 196. Lead 196 is connected to one input terminal of the apparatus shown in block form at 190, which may include an amplifier similar to 118, a phase sensor similar to 133, a flip-flop similar to 164-176, and a controlled device, and lead 196 may correspond to lead 111 of FIG. 2. Across the two secondaries is connected, in series, the potentiometer 197 and resistor 198. The arm 199 of the potentiometer is connected by lead 200 to the other input terminal of the apparatus 190, lead 200 corresponding to lead 113 of FIG. 2.

In the operation of the circuit of FIG. 3, as the slug 192 moves in response to variations in the value of some variable, which results in movement being transmitted to the slug through the coupling 193, the signals from the two secondaries 194 and 195 become unbalanced and an unbalance signal is developed between leads 196 and 200 which is supplied to the input transistor corresponding to 118.

Figure 4:
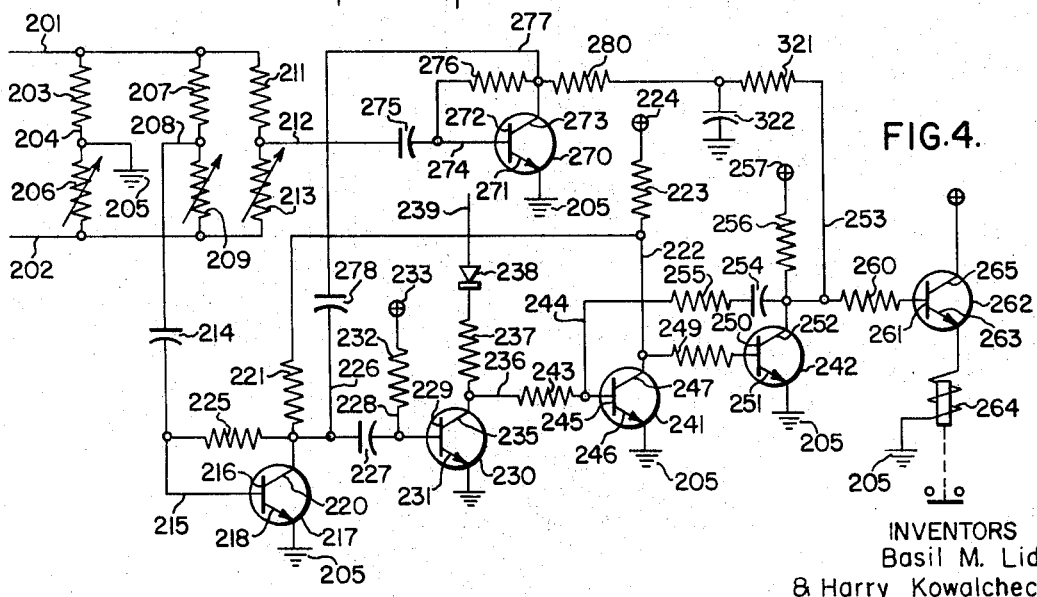
FIG. 4 is a schematic electrical circuit diagram of a phase sensitive monostable circuit according to another embodiment of our invention.

Particular reference is made now to FIG. 4 showing a modification of the circuit of FIG. 2, in which an additional transistor is provided to take control after the unbalance reaches at least a predetermined degree and the multivibrator circuit has changed between states as a result of that unbalance. In FIG. 4, an alternating current voltage is applied between the leads 201 and 202; across these two leads is connected one branch of a bridge circuit including resistor 203, lead 204 connected to ground 205, and resistance thermometer 206 which, it is understood, has a resistance value which varies in accordance with variations in a quantity, which variations are to be utilized for control purposes. Another branch of the bridge connected to leads 201 and 202 comprises the resistor 207, lead 208 and resistor 209. A third branch of the bridge is constituted by resistor 211, lead 212 and resistor 213.

Lead 208 is connected by way of capacitor 214 and lead 215 to the base 216 of a transistor 217 having the emitter 218 thereof connected to ground 205. The collector 220 is connected by way of lead 226, resistor 221, lead 222 and resistor 223 to the positive terminal 224 of a suitable source of direct current potential, not shown, having the negative terminal thereof connected to ground.

The aforementioned lead 215 is connected by way of resistor 225, lead 226, capacitor 227, and lead 228 to the base 229 of a phase sensing transistor 230 having the emitter 231 thereof connected to ground 205. The lead 228 and base 229 are connected by way of resistor 232 to the positive terminal 233 of a source of direct current potential, not shown, having the other negative terminal thereof connected to ground 205. The phase sensing transistor 230 has the collector 235 thereof connected by way of lead 236, resistor 237, rectifier 238 and lead 239 to one terminal of the secondary of a transformer which may correspond to the secondary 104 of FIG. 2, the other terminal of the secondary being connected to ground 205. Lead 239 may be identical with lead 139. The primary of the transformer whose secondary supplies an alternating current to lead 239 is preferably energized from leads 201 and 202. In this way a pulsating direct current is applied to the collector 235, and this provides that the transistor 230 has an output only when a predetermined phase relationship exists between the voltage on the collector and the alternating current signal applied to the base thereof.

The two transistors 241 and 242 comprise a monostable multivibrator or flip-flop circuit. The base 245 of transistor 241 is coupled by way of lead 244, resistor 243 and lead 236 to collector 235. The collector 252 of transistor 242 is coupled by capacitor 254 and resistor 255 to the base 245 of transistor 241, and the collector 247 of transistor 241 is coupled by resistor 249 to the base 250 of transistor 242. Emitter 246 of transistor 241 is connected to ground, and transistor 242 has emitter 251 thereof connected to ground 205. As aforementioned, the collector 252 of transistor 242 is connected by way of lead 253, capacitor 254 and resistor 255 to the aforementioned lead 244. Lead 253 is connected by way of resistor 256 to the positive terminal 257 of a suitable source of direct current potential, not shown, having the other negative terminal thereof connected to ground 205. Lead 253 and collector 252 are also connected by way of resistor 260 to the base 261 of an emitter follower transistor 262 having the emitter 263 thereof connected by way of relay coil 264 to ground 205. Relay 264 may control heater apparatus for varying the temperature of transducer 206. Collector 265 is connected to a suitable source of direct current energizing potential, not shown, having the other terminal thereof operatively connected to ground.

An additional transistor 270 is provided, having an emitter 271, base 272 and collector 273. The emitter 271 is connected to ground 205. The base 272 is connected by way of lead 274 and capacitor 275 to the aforementioned lead 212. Lead 274 is connected by way of resistor 276 and lead 277 to the collector 273. Lead 277 is connected by way of capacitor 278 to lead 226. The aforementioned collector 273 of transistor 270 is also connected by way of lead 277, resistor 280 and resistor 321 to the aforementioned lead 253. The junction between resistors 321 and 280 is connected by way of capacitor 322 to ground.

In understanding the operation of the apparatus of FIG. 4, it should be borne in mind that the circuit provides for a wide loop width and a flip-flop trip-off point adjustable over the entire range to the trip-on point. The term "loop width" as employed herein is used to designate the magnitude range over which the variable quantity may vary between the trip-on point and the trip-off point. This is accomplished by utilizing the multivibrator to control its own input signal. It will be noted that while transistor 242 is conductive, which it normally is until a trip signal causes transistor 241 to conduct and transistor 242 to become non-conductive, a very small voltage drop approaching zero appears across transistor 242 and accordingly substantially zero potential is applied by way of lead 253 and resistor 280 to the collector 273 of transistor 270 to provide no energizing potential thereto. On the other hand, when the flip-flop circuit of transistors 241 and 242 renders transistor 242 non-conductive, a substantial voltage from terminal 257 appears on lead 253 providing an energizing potential to the transistor 270. Transistor 270 is referred to herein as the off transistor, whereas transistor 217 is referred to as the on transistor.

Transistor 217 amplifies the output of the bridge portion comprising resistors 203, 206, 207 and 209, and this output is amplified and applied as a signal to the base 229 of transistor 230, which is normally biased slightly beyond saturation. Transistor 230 has a pulsating direct current potential applied to the collector thereof and produces an output only when a predetermined desired phase relationship exists between the signal applied to the base 229 and the pulsed direct current signal applied to the collector 235.

Assume by way of example that with the bridge comprising resistors 203, 206, 207 and 209 balanced, so that no signal is developed at base 229, and assuming further that in this condition transistor 242 is conductive so that no substantial voltage appears on lead 253 and is applied to transistor 270, then when the trip-on point is reached, that is, when the voltage difference resulting from temperature changes on transducer 206 is sufficiently great, the flip-flop circuit is caused to change to its other state, saturating transistor 241 and cutting off transistor 242. This results in the application of an energizing potential to the collector 273 of transistor 270 as well as supplying a biasing or gating or energizing potential to the base 261 of the emitter follower transistor 262 resulting in the energizing of the relay coil 264.

Resistor 213 can be adjusted in value with respect to resistor 211 to provide that until the desired trip-off point, the bridge may remain sufficiently unbalanced to provide a signal of sufficient amplitude to transistor 270, which signal is amplified and applied by way of coupling capacitors 278 and 227 to the base 229 of the phase sensor transistor 230, where, assuming that the desired phase relationship exists, the amplified signal is applied to the base of transistor 241 causing the circuit again to substantially remain in its quasi-stable state, thereby causing transistor 241 to remain saturated, causing transistor 242 to remain cut off, causing the energizing potential to remain on collector 273 of transistor 270, and causing the relay winding 264 to remain energized until the trip-off point is reached.

It will be understood that transistor 241 may periodically return momentarily to a cut off state, but that within one cycle the multivibrator retrips, if the necessary signal is still present at base 229.

It is seen then that by the addition of another bridge resistance path in parallel with the branch of resistors 207 and 209, and the additional transistor 270, that a trip-off point of adjustable sensitivity is provided to cause the relay winding 264 to be energized and thereafter deenergized at any desired value of bridge unbalance corresponding to any desired variation in the quantity which exercises control.

It should be understood that the term "trip on" refers to turning on transistor 164, or transistor 241, depending on the circuit employed, and may result in turning off the heat which would result in increased temperature at transducer 46 or 206 or increased pressure and further movement of slug 87 or 192.

As an example of the operation of the circuit of FIG. 4, assume that when relay 264 is energized it turns the heat off. Assume that the apparatus is at an initial temperature of 400°, that it is desired to raise it to 500° and have the temperature stabilized between 500 to 490°, a "loop width" of 10°.

From previous calibrations, resistor 209 is adjusted to a value which causes that branch to balance, or produce zero output, at 500°. From previous calibrations, resistor 213 is adjusted to a value which causes that branch to balance, or produce zero output, at 490°. The heat is turned on. Transistor 241 is normally off and relay 264 normally deenergized. As the temperature at 206 approaches but is below 500°, there is a signal on lead 208 but it is the wrong phase. After 500° has been reached and slightly passed, the signal on lead 208 becomes of the proper phase, tripping transistor 241 on, energizing transistor 270 and relay 264 and turning the heat off. With 10° unbalance in that branch, there is now a large signal of the proper phase on lead 212, which maintains transistor 241 on or more precisely, keeps repeatedly turning it back on immediately every time it returns from its unstable or quasi-stable state to its normal stable state. As the temperature at 206 gradually falls after the heat is turned off, the signal on lead 212 diminishes in amplitude, and at balance, 490°, suddenly reverses in phase, allowing transistor 241 to become off. This turns the heat back on, the temperature at 206 begins to increase, and the cycle is repeated.

The circuit of FIG. 4 may be used with the differential transformer of FIG. 3 by supplying in parallel with branch 197-198 another branch including resistor 211, lead 212 and resistor 213, with appropriate connections being made.

Figure 9:
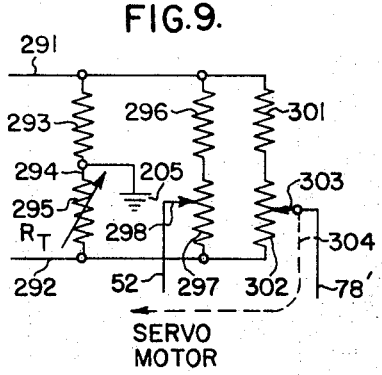
FIG. 9 is a fragmentary circuit portion showing a bridge arrangement suitable for use in the apparatus of FIG. 2 when employed in the complete system of FIG. 5.

Particular reference is made now to FIG. 9, which shows a modification of the circuits of FIGS. 2 and 5, in which one bridge has a pair of paralleled resistance paths in one branch, one path of the paralleled paths having a potentiometer therein for supplying a signal to the monostable amplifier circuit, and the other of the paralleled resistance paths having therein a potentiometer having an arm which is operatively connected to a servo motor for providing a null balance indication type of circuit. In FIG. 9, the leads 291 and 292 have an alternating current voltage impressed thereacross, and may be connected to the power supply 51 of FIG. 5, or may be connected to and supplied from the power transformer of FIG. 2. One branch of the bridge includes a resistor 293 connected by way of lead 294 to a resistance thermometer 295, the resistance value of which varies in accordance with variations in the temperature. The lead 294 is connected to ground 205. In the other branch, one parallel resistance path includes resistor 296 connected by way of potentiometer 297 to the opposite lead 292. The arm 298 of potentiometer 297 is connected to lead 52 and supplies an input to a transistor amplifier. Lead 52 of FIG. 9 may correspond approximately to lead 113 of FIG. 2. The other paralleled resistance path includes resistor 301 and potentiometer 302 in series across leads 291 and 292. The arm 303 of potentiometer 302 is connected to lead 78', which may correspond to lead 78 of FIG. 5, it being understood that the other input terminal to the servo amplifier, not shown, is connected to ground 205. The linkage 304 may correspond to the linkage 70 of FIG. 5.

In order that errors in the indication device connected to mechanical linkage 304 may be reduced to a minimum, it is desirable that the lead 52 be connected to a high impedance load and this is contemplated, the load impedance being as high as convenient in view of the transistor circuitry involved.

By adjusting the position of arm 298, the trip-on point of the amplifier circuit of FIG. 2 may be adjusted, and this static trip may be substantially independent of movement of the arm 303 in response to running of the servo motor to affect a null balance and provide an indication accordingly. It will be understood that in the adjustment and calibration of the servo and the indication device, account will be taken of the parallel circuit including resistors 296 and 297.

Figure 10:
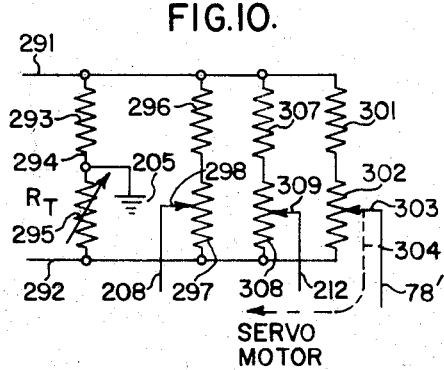
FIG. 10 is an additional fragmentary bridge portion of a circuit suitable for use in the circuit of FIG. 4 when employed in the arrangement of FIG. 5.

Particular reference is made now to FIG. 10, in which the circuits of FIGS. 4 and 5 are combined, one resistance thermometer being employed in a bridge arrangement having three parallel circuits or three parallel resistance paths in one branch thereof. The additional path of the parallel paths of FIG. 10 includes resistor 307 and potentiometer 308 having arm 309 connected to lead 212. Accordingly, it is seen that one resistance thermometer, in this case thermometer 295, is used in a bridge arrangement which provides two signals to the monostable multivibrator and amplifier of FIG. 4 to provide both a trip-on and a trip-off signal, and at the same time provides a signal to a servo amplifier, causing a servo motor to produce a null balance by an additional potentiometer arm. It will be understood that in the calibration of the circuit of FIG. 10, account is taken of the parallel resistance paths, and also in utilizing the circuit of FIG. 10, it is desirable to keep the load on leads 208 and 212 as small as possible, and to keep the terminating impedances as large as possible to reduce errors in the indication circuit to a minimum.

Particular reference is made again to the circuit of FIG. 2. As previously stated transistor 164 is normally "cut off". It is rendered conductive by a bridge unbalance signal of the proper phase and magnitude such as signal A'' of FIG. 8C. When 164 becomes conductive, the positive bias on the base of phase sensor transistor 133 is slightly decreased to that a small decrease in signal on the base 132 does not allow the multivibrator to trip off. Until the circuit is reset by a greater decrease in signal, the multivibrator will remain on.

Figure 11:
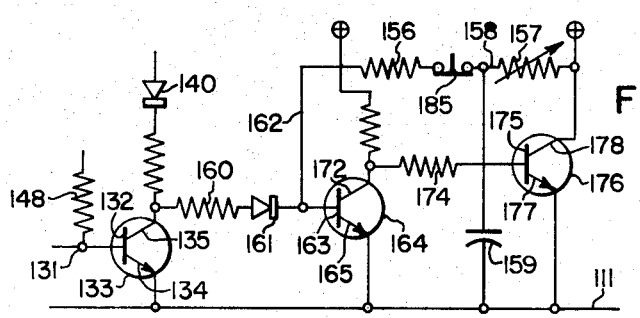
FIG. 11 is a fragmentary circuit diagram of a modified portion of the circuit of FIG. 2 according to an additional embodiment of the invention.

Particular reference is made now to FIG. 11, in which a modified circuit is shown, according to an additional embodiment of the invention. In FIG. 11 the bias control feedback link including rectifier 150 and resistor 153, for controlling the bias on the phase sensing transistor 133, is no longer employed. In FIG. 11, resistors 156 and 157 joined by lead 158 and reset switch 185 interconnect the collector of transistor 176 and the base of transistor 164. Lead 158 is connected by way of capacitor 159 to lead 111. Capacitor 159 serves as an integrator to prevent the circuit from tripping on at every single pulse. This effectively prevents any random noise pulses from causing a false trip, but allows a repetitive signal pulse to correctly trip the circuit. Once the multivibrator has assumed a state in response to a signal pulse, it remains in that state until the circuit is opened at reset switch 185.

Again by way of summarizing the operation of the circuit of FIG. 2, once the multivibrator has tripped on, a certain length of time, which is determined by the value of resistor 166 and capacitor 168, must elapse before the circuit is restored for further operation. When the flip-flop returns to its reset or original state, within one cycle, if the bridge is still above balance, it retrips. For a shut down signal, the first time the flip-flop trips is the only important occurrence. However, for turning on and off of heaters to control system pressure, the off point is also important. It should be noted that in at least one embodiment shown the multivibrator circuit trips for a finite time, resets itself, and if told on the next cycle that it should still be tripped, it trips again within a cycle. Since the amount of time the flip-flop will stay tripped can be adjusted, on-off control can be stabilized by varying the time on instead of requiring the handling of two accurate signal level points.

In all embodiments, resistance values and potential values may be easily selected to provide for operation in the desired manner.

In FIG. 4, the R-C circuit 321-322 may be omitted if not needed. After transistor 241 is momentarily turned off, for one alternation transistor 242 may be on, with loss of voltage on lead 253. The R-C circuit insures that transistor 270 will not lose control during this brief period.

The term "multivibrator amplifier" as employed herein and in the claims appended hereto, includes a dual-state circuit which is in one state until a signal causes it to change to a second state, and which remains in the second state a substantial period of time determined at least in part by the time constant of a time delay circuit included in the amplifier.

Whereas the invention has been shown and described with respect to some embodiments thereof which give staisfactory results, it should be understood that changes may be made and equivalents substituted without departing from the spirit and scope of the invention.

We claim as our invention:

1. Apparatus for providing from a single transducer responsive to variations in a variable quantity an indication signal for indicating changes in the value of the variable quantity and a control signal when variations in the value of the variable quantity attain at least a predetermined magnitude, the indication and the control signals being substantially independent of each other, comprising in combination, bridge means having a first branch consisting of a resistor in series with a transducer the resistance value of which varies in accordance with variations in the variable quantity and a second branch comprising means forming two parallel current paths, one of said path forming means consisting of a series-connected additional resistor and a potentiometer having an adjustable arm, the other of said path forming means consisting of a further resistor and a rheostat in series therewith, servo amplifier means connected between the junction of the first-named resistor and the transducer and the junction between the further resistor and the rheostat to be energized by an unbalance signal developed thereacross, servo motor means connected to the servo amplifier means to receive the output thereof, linkage means connecting the servo motor means to the rheostat to vary the value of the resistance thereof in a direction which tends to reduce the unbalance signal at the input of the servo amplifier means to zero, means including a monostable multivibrator connected between the junction of the first-named resistor and the transducer and to the arm of the potentiometer to be energized by the control signal developed thereacross whereby the multivibrator is substantially continually in one state while the control signal is present in a predetermined phase and in at least a predetermined amplitude, and is in the other state while said control signal is not in said predetermined phase irrespective of the amplitude thereof, and control means connected to the multivibrator to be operated to one control condition when the multivibrator is in one state and to be operated to another control condition when the multivibrator is in the other state.

2. In a circuit for providing a null type indication of the instant value of a variable and for providing a control signal when the variable deviates substantially from a predetermined value, in combination, means forming a bridge circuit having two branches, one of said branches including an element responsive to variations in the variable, the other of said branches including means forming two resistance paths, means connected to the variable responsive element and to the means forming one of the resistance paths for obtaining a control signal, means for amplifying said control signal, controllable means connected to the amplifying means for utilizing the control signal, the means forming the other of said resistance paths including a variable resistor, circuit means connected to the variable responsive element and to the means forming the other of the resistance paths and including a servo amplifier and a servo motor, and means connecting the servo motor to said variable resistor of the last-named path for adjusting the value of said variable resistor automatically in accordance with variations in the variable to thereby provide a null balance, and indicating means connected to the adjusting means for providing an indication in accordance with the setting of the adjusting means.

3. In control circuit apparatus, in combination, a resistance thermometer, means forming an alternating current bridge, said bridge having the resistance thermometer connected in one branch thereof and being constructed and arranged whereby when the bridge is off balance in one sense a signal of one phase is developed at the output of the bridge and when the bridge is off balance in the other sense a signal of opposite phase is developed at the output of the bridge, amplifier means connected to the bridge for amplifying the output signal thereof, phase sensing means connected to the amplifier means, a monostable flip-flop circuit connected to the phase sensing means to receive the output therefrom whereby the monostable flip-flop circuit is caused to change from a first state to a second state only when the bridge is unbalanced in at least a predetermined amount and in a predetermined sense, and a controlled element operatively connected to the monostable flip-flop circuit, the controlled element being changed from an on condition to an off condition selectively in accordance with the state of the monostable flip-flop circuit.

4. In control apparatus, in combination, alternating current bridge means including a variable element responsive to variations in a quantity, means connected to the bridge means for amplifying the signal output thereof resulting from variations in the variable element, phase sensitive means including a transistor having a collector, an emitter and a base, circuit means connecting the phase sensitive means to the amplifying means to receive the output therefrom, means connected to the transistor for applying a pulsating direct current potential to said collector of the same frequency as the alternating current, output means connected to the phase sensitive transistor means, the output means developing a pulsed signal thereacross when the input to the phase sensitive transistor means has a predetermined phase relationship with respect to the pulsating direct current potential, a monostable flip-flop circuit including first and second transistors each having a base, collector, and emitter, the first transistor being connected to receive as an input between the base and emitter thereof the pulsed signal of the output means, the pulsed signal of the output means causing the monostable circuit to switch between the two states thereof, and feedback means including a resistor and a rectifier connecting the collector of the first transistor to the base of the transistor of the phase sensitive means, the feedback means providing means for varying the bias point of the transistor of the phase sensitive means.

5. Control circuit apparatus comprising, in combination, bridge means including in one branch thereof a transducer having a resistance value which varies in accordance with variations in a quantity, said bridge means including as energizing means an alternating current source of predetermined frequency, phase sensing transistor means including a transistor having a base, collector and emitter, means for applying a half-wave rectified alternating current of the same frequency as that of the alternating current energizing the bridge means to said collector, means for amplifying the output of the bridge means and applying the amplified output as an input to the transistor of the phase sensing transistor means between the base and emitter thereof, the phase sensing transistor means supplying a pulse output only when the phase of the input thereto has a predetermined relationship to the phase of the rectified pulsating direct current applied to the collector thereof, a monostable flip-flop transistor circuit including first and second transistors each having a base, collector, and emitter, and positive feedback circuit means connecting the collector of the second transistor to the base of the first transistor, the first transistor being connected to the phase sensing transistor to receive the pulse output thereof, and output means including a controlled element connected to the second transistor, said positive feedback circuit means including means having an adjustable time constant, variations in said time constant varying the number of pulses in the output of the phase sensing transistor means which elapse before the transition of the monostable circuit between the two states thereof.

6. In a control circuit, in combination, a transducer having an impedance value which varies in accordance with variations in a quantity, bridge means having the transducer connected in one branch thereof, the bridge means providing first and second signals when the bridge is unbalanced, a controlled device, a transistor monostable multivibrator having a first state and a second state and having the output thereof operatively connected to the controlled device, the controlled device being in a first control condition while the multivibrator is in a first state and in a second control condition while the multivibrator is in a second state, circuit means connecting the multivibrator to the bridge means for utilizing the first signal to cause the multivibrator to change from a first state to a second state when the first signal has a pre-determined phase and at least a predetermined amplitude, and means including a normally unenergized device connecting the bridge means to the multivibrator whereby the second signal is supplied to the multivibrator when the normally unenergized device is energized, said unenergized device being connected to the multivibrator whereby the device is energized when the multivibrator changes from a first state to a second state, the second signal when applied to the multivibrator in at least a predetermined amplitude preventing the multivibrator from switching from the second state to the first state for a substantial period of time.

7. In control circuit apparatus, in combination, bridge circuit means, said bridge circuit means having connected therein transducer means responsive to variations in a variable quantity, said bridge circuit means providing first and second signals of first and second amplitudes respectively for selectively turning on and off an element to be controlled, signal amplifying means having the first signal applied thereto, a monostable transistor multivibrator having the amplified first signal applied thereto and being operatively connected to the element to be controlled whereby the element to be controlled is on while the multivibrator is in one state and the element to be controlled is off while the multivibrator is in the other state, the amplified first signal causing the multivibrator to undergo a transition between a first state and a second state, a transistor operatively connected to the multivibrator to have an energizing potential applied thereto while the multivibrator is in the second state and having no energizing potential applied thereto while the multivibrator is in the first state, circuit means connecting the transistor to the bridge circuit means to have the second signal applied thereto, and other circuit means connecting the transistor to the multivibrator whereby when energizing potential is applied to the transistor the second signal, after amplification by the transistor, is applied to the multivibrator and when of at least a predetermined amplitude prevents the multivibrator from changing from the second state to the first state for a substantial period of time.

8. In control circuit apparatus, in combination, a source of alternating current potential, a transducer responsive to variations in a variable, bridge means connected to the source and having the transducer connected in circuit therein for providing an output signal at unbalance, the output signal varying in phase in accordance with the sense of unbalance of the bridge means, means for amplifying the output signal, a transistor having a base, emitter and collector, means for applying the amplified signal between said base and emitter, means connected to the source of alternating current potential for obtaining a half-wave rectified voltage and for applying the half-wave rectified voltage to said collector, said transistor supplying output pulses only when the input thereto has a predetermined phase relationship with the half-wave rectified voltage on the collector thereof, and a monostable flip-flop transistor circuit connected to said collector to receive pulses therefrom, said pulses when of at least a predetermined amplitude causing the monostable flip-flop circuit to change from a first state to a second state.

9. Control apparatus comprising, in combination, a differential transformer including a primary, first and second secondaries and a movable slug core of magnetizable material, circuit means including a source of alternating current potential for energizing the primary, means connected to the slug core whereby the slug core has the position thereof varied in accordance with variations in a quantity, bridge circuit means connecting the first and second secondaries in series to form one branch of the bridge, the other branch of the bridge circuit means including in series a resistor and a potentiometer having an adjustable arm, output means connected to the arm and the junction between the first and second secondaries, means for amplifying the signal developed at the output means, phase sensing means operatively connected to the amplifying means and to the source of alternating current potential, a multivibrator connected to the phase sensing means to be switched between states when the input to the phase sensing means has a predetermined phase and at least a predetermined amplitude, and utilization means including a controlled device connected to the multivibrator.

10. In a circuit for providing a null type indication of the instant value of variable quantity and for providing a control signal when the variable deviates by a predetermined amount from a predetermined value, in combination, a resistance thermometer having a resistance value which varies with the variable quantity, bridge means having the resistance thermometer in one branch thereof, variable resistance means in the other branch thereof, a source of alternating current potential connected to the bridge means, circuit means connected to the bridge means for obtaining an alternating current control signal and an alternating current indication signal, servo means having the indication signal applied thereto, the servo means being operatively connected to the variable resistance means and utilizing the indication signal to vary the resistance in a manner which tends to reduce the indication error signal to zero, a phase sensor device connected to the source of alternating current potential and to the bridge means to have the control signal applied thereto, the phase sensor device providing an output only when the control signal has a predetermined phase relationship to the alternating current, multivibrator means connected to the phase sensor device and being switched between states when the output of the phase sensor device has at least a predetermined amplitude, and utilization means connected to the multivibrator means.

11. In indication and control apparatus for obtaining first and second control signals and an indication signal, in combination, a source of alternating current potential, a transducer having an impedance which varies with variations in a quantity, and a bridge connected to the source of alternating current potential to be energized therefrom, the bridge having the transducer in one branch thereof, the other branch of the bridge including means forming first, second, and third resistance paths all connected in parallel, the first path having a first potentiometer therein having an adjustable arm, the first control signal being obtained from said arm, the second path having a second potentiometer therein having an adjustable arm, the second control signal being obtained from said last-named arm, the third path having a variable resistor therein adapted to have the resistance value thereof varied to rebalance the third path of the branch of the bridge after the impedance of the transducer changes.

12. In indication and control apparatus for obtaining a control signal and an indication signal, in combination, a source of alternating current potential, a transducer having an impedance which varies with variations in a quantity, a bridge connected to the source of alternating current potential to be energized therefrom, the bridge having the transducer in one brahch thereof, the other branch of the bridge including means forming first and second resistance paths connected in parallel, the first path having a potentiometer therein having an adjustable arm, the control signal being obtained from said arm, the second path having a variable resistor therein adapted to have the resistance value thereof varied to rebalance the second path of the bridge after the impedance of the transducer changes.

13. In a circuit for providing a null type indication of the instant value of a variable quantity and for providing a control signal when the variable deviates by a predetermined amount from a predetermined value, in combination, a differential transformer including a primary, first and second secondaries and a movable slug core composed of magnetizable material, circuit means including a source of alternating current potential for energizing the primary, means connected to the slug core whereby the slug core has the position thereof varied in accordance with variations in the quantity, bridge circuit means connecting the first and second secondaries in series to form one branch of the bridge, variable resistance means in the other branch thereof, circuit means connected to the bridge means for obtaining a control signal and an indication signal, servo means having the indication signal applied thereto, the servo means being operatively connected to the variable resistance means and utilizing the indication signal to vary the resistance in a manner which tends to reduce the indication signal to zero, multivibrator means, further circuit means connecting the multivibrator means to the bridge means for utilizing the control signal to switch the multivibrator means between states, and utilization means connected to the multivibrator means.

14. In a control circuit of the type in which the instant amplitude of a variable alternating current signal corresponds to the instant deviation of a quantity to be controlled from a preselected value and the phase of the signal reverses as the amplitude of the signal goes through zero as the signal changes in sense from a value which deviates in one direction from the preselected value to one which deviates in the other direction from the preselected value, and in which the signal is utilized to turn on and off a device which while on varies the quantity in a manner to restore the quantity to the preselected value, in combination, alternating current signal obtaining means constructed and arranged to provide a variable signal which varies in amplitude in accordance with variations in the quantity from the preselected value and reverses in phase when the sense of the variation changes, phase sensing transistor means having the signal applied thereto and including a transistor normally biased slightly beyond saturation and having a pulsating direct current potential of the same frequency as the alternating current signal applied thereto for providing an output when the signal has at least a predetermined amplitude and a predetermined phase relationship to said pulsating direct current potential, a multivibrator connected to the phase sensing transistor means and being switched from a first normal state to a second state by the output of the phase sensing transistor means, the multivibrator including time constant means for maintaining the multivibrator in the second state a predetermined time interval after which the multivibrator returns to the first state, means adapted to connect the multivibrator to the device, and means operatively connected to the multivibrator and to the phase sensing transistor means for varying the bias on the transistor of the phase sensing transistor means toward saturation when the multivibrator switches to the second state whereby a signal at the transistor means smaller in amplitude relative to said predetermined amplitude will thereafter cause the multivibrator to switch from the first state to the second state.

15. In control apparatus, in combination, alternating current bridge means, the alternating current bridge means including a source of alternating current potential, phase sensing means operatively connected to the bridge means and having the output signal of the bridge means applied thereto, circuit means connecting the phase sensing means to the alternating current source, the phase sensing means including a transistor normally biased beyond saturation, the circuit means connecting the phase sensing means to the alternating current source including half-wave rectifier means for obtaining a pulsating direct current potential of predetermined polarity and applying the pulses thereof to the collector of the transistor to energize the same, the transistor providing no output when the phase of the signal applied thereto is of a polarity to increase the bias while a pulse is applied to said collector, the phase sensing means supplying an output signal when the signal applied thereto reduces the bias coincidentally with the appearance of the pulse on the collector thereof, multivibrator means including a time delay circuit operatively connected to the phase sensing means, the multivibrator means being switched from a first state to a second state by the application of an input signal thereto from the phase sensing means, the multivibrator means thereafter returning from the second state to the first state after a period of time determined by the time constant of the time delay circuit, the appearance thereafter of a signal in the output of the phase sensing means causing the multivibrator to again change from the first state to the second state.

16. In control apparatus, in combination, means including alternating current bridge means and a biased amplifier, the biased amplifier being normally biased at a point whereby a signal of at least a first predetermined amplitude causes an output from the biased amplifier, a multivibrator circuit connected to the biased amplifier to receive the output signal therefrom, the output signal causing the multivibrator circuit to change from a first stage to a second state, the multivibrator circuit including time delay means for returning the multivibrator circuit to the first state after the lapse of a predetermined time, and circuit means connecting the multivibrator circuit to the biased amplifier for altering the bias on the biased amplifier when the multivibrator circuit assumes the second state whereby a signal of a second predetermined amplitude less than said first predetermined amplitude produces an output sufficient to cause the multivibrator to change from the first state to the second state.

17. In control apparatus, in combination, alternating current bridge means having in one branch thereof means for obtaining first and second signals of two different amplitudes, a first amplitude and a second amplitude respectively, a multivibrator circuit having a first state and a second state, circuit means connecting the bridge means to the multivibrator circuit for utilizing the first signal of the first amplitude to cause the multivibrator to switch from the first state to the second state, normally deenergized other circuit means connecting the bridge means to the multivibrator circuit, means connecting the other circuit means to the multivibrator circuit whereby the other circuit means is energized when the multivibrator circuit changes to the second state, the other circuit means thereupon providing that a second signal of said second amplitude is thereafter sufficient to cause the multivibrator circuit to change from the first state to the second state.

18. In control and indicating apparatus, in combination, alternating current bridge means including transducer means for supplying at least two output signals from first and second branches, servo means for utilizing the first output signal to maintain the first branch of the bridge in a balanced condition and provide an indication of the instant value of a variable quantity in terms of the instant condition of said transducer means in the bridge, a controlled device, and circuit means connecting the controlled device to the second branch of the bridge means for utilizing the second signal to switch the controlled device between a first control condition and a second control condition, the last-named circuit means including means for maintaining the controlled device in a condition to change the variable quantity toward the normal desired value thereof while the second signal is changing in amplitude.

19. In control and indication apparatus, in combination, alternating current bridge means including a first branch and a second branch, both the first branch and the second branch including the same transducer means responsive to variations in a variable quantity, the first and second branches including means for obtaining at least two signals which vary with variations in said quantity, servo means connected to the bridge for utilizing the first signal to maintain the first branch of the bridge in a balanced condition, indicator means operatively connected to the servo means for giving an indication of the quantity in terms of the output of the transducer means, a controlled device, circuit means including a multivibrator connecting the controlled device to the second branch of the bridge means, the second signal causing the multivibrator to switch from a first condition to a second condition at which second condition the controlled device is operated and the variable quantity tends to be changed toward a normal value, the circuit means including means for maintaining the controlled device operated while the signal from the transducer means is falling in amplitude as the variable quantity varies in magnitude toward said normal condition.

20. In control apparatus, in combination, a controlled device which is moved to a first control condition when the value of a variable quantity reaches at least a predetermined value and which is moved to a second control condition when the variable quantity thereafter changes to a second predetermined value, alternating current bridge means responsive to variations in the quantity for obtaining first and second signals of different amplitudes, switching means including amplifier means adapted to change the controlled device from the first control condition to the second control condition, first and second parallel circuit paths connecting the switching means to the bridge means and having the first signal applied to the first path and the second signal applied to the second path, the second path including normally deenergized means for preventing the passage of the signal therethrough, and means connecting the amplifier means to the normally deenergized means for energizing the last-named means and activating the second circuit path after the first circuit path has caused the controlled device to move from one control position to the other control position, the signal through the second path causing the control device to remain in the other control condition until the second signal changes to at least a predetermined third amplitude.

* * * * *